United States Patent
Zuo et al.

(10) Patent No.: US 7,160,131 B1
(45) Date of Patent: Jan. 9, 2007

(54) SIM CARD HOLDER

(75) Inventors: Zhou-Quan Zuo, Shenzhen (CN); Chia-Hua Chen, Tu-cheng (TW)

(73) Assignee: Fih Co., Ltd., Shindian (TW)

( * ) Notice: Subject to any disclaimer, the term of this patent is extended or adjusted under 35 U.S.C. 154(b) by 0 days.

(21) Appl. No.: 11/384,775

(22) Filed: Mar. 20, 2006

(30) Foreign Application Priority Data

Jun. 3, 2005 (CN) .................... 2005 1 0035139

(51) Int. Cl.
*H01R 13/62* (2006.01)
(52) U.S. Cl. ........................... 439/331; 439/136
(58) Field of Classification Search ............... 439/135, 439/136, 331; 235/492
See application file for complete search history.

(56) References Cited

U.S. PATENT DOCUMENTS

| | | | |
|---|---|---|---|
| 4,130,327 A * | 12/1978 | Spaulding .................... | 439/71 |
| 4,427,249 A * | 1/1984 | Bright et al. ................ | 439/68 |
| 4,621,884 A * | 11/1986 | Berkebile et al. ........... | 439/367 |
| 4,692,790 A * | 9/1987 | Oyamada .................... | 257/727 |
| 6,719,580 B1 * | 4/2004 | Ma ............................. | 439/331 |
| 6,876,552 B1 * | 4/2005 | Pan et al. .................... | 361/730 |

FOREIGN PATENT DOCUMENTS

CN  200320116778.6  3/2005

* cited by examiner

*Primary Examiner*—Thanh-Tam Le
(74) *Attorney, Agent, or Firm*—Jeffrey T. Knapp

(57) ABSTRACT

A SIM card holder includes a base (10) and a catching mechanism (20). The base defines a receiving groove (114) and a slot (110). The receiving groove is configured for receiving the SIM card therein. The base comprises a protrusion (108). The protrusion and the slot are arranged at two opposite sides of the receiving groove. The catching mechanism comprises a main board (201) having a bending piece (202) and a bending hem (204) at two opposite ends thereof. The bending hem is engaged in the slot. The bending piece is engagable with the base so as to lock the SIM card in the receiving groove. The main board comprises an elastic slice resisting the protrusion when the bending piece is engaged with the base.

20 Claims, 8 Drawing Sheets

US 7,160,131 B1

SIM CARD HOLDER

BACKGROUND OF THE INVENTION

1. Field of the Invention

The present invention generally relates to SIM card (subscriber identification module card) holders and, more particularly, to a SIM card holder for seating a SIM card onto an electronic device such as a mobile phone.

2. Discussion of the Related Art

Nowadays, mobile phones are widely used and bring convenience to our lives, mobile phones have become a part of modern life. Every mobile phone has a SIM card for carrying information which is necessary for people to operate the mobile phone. The SIM card may also contain personal information for the subscriber, for example, a listing of frequently used telephone numbers. Therefore, a SIM card holder is necessary for holding the SIM card in electronic devices such as mobile phones.

Referring to FIG. 1, a typical SIM card holder is disclosed as follows. The SIM card holder includes a mounting base 80 and a locking element 90. A receiving groove 801 is defined in the mounting base 80 for receiving a SIM card. The locking element 90 includes a fixing portion 901, an operating portion 903 and a deformable portion 905. The locking element 90 is mounted on the mounting base 80. The fixing portion 901 protrudes over the receiving groove 801 to hold the SIM card. When the operating portion 903 is pulled manually, the deformable portion 905 deforms and the fixing portion 901 moves away from the receiving groove 801, thereby the SIM card can be removed from the receiving groove 801 of the mounting base 80.

It can be seen that the deformable portion 905 of the locking element 90 is very large, and a height of the deformable portion 905 will increase when pulling the operating portion 903. Thus, the SIM card holder occupies too much space, which results in an overly large size for electronic devices such as mobile phones. In addition, when a person is installing or removing the SIM card, he or she must hold the mobile phone and operate the locking element 90 with one hand and remove the SIM card simultaneously with another hand. That is, it is very inconvenient for the user to operate the SIM card holder.

What is needed, therefore, is a SIM card holder which has small height and is easily operated.

SUMMARY OF THE INVENTION

A SIM card holder includes a base and a catching mechanism. The base defines a receiving groove and a slot. The receiving groove is configured for receiving the SIM card therein. The base comprises a protrusion. The protrusion and the slot are arranged at two opposite sides of the receiving groove. The catching mechanism comprises a main board having a bending piece and a bending hem at two opposite ends thereof. The bending hem is engaged in the slot. The bending piece is engagable with the base so as to lock the SIM card in the receiving groove. The main board comprises an elastic slice resisting the protrusion when the bending piece is engaged with the base.

Other advantages and novel features of preferred embodiments of the present hinge system and its applications will become more apparent from the following detailed description when taken in conjunction with the accompanying drawings.

BRIEF DESCRIPTION OF THE DRAWINGS

Many aspects of the present SIM card holders and their applications can be better understood with reference to the following drawings. The components in the drawings are not necessarily to scale, the emphasis instead being placed upon clearly illustrating the principles of SIM card holders. Moreover, in the drawings, like reference numerals designate corresponding parts throughout the several views.

DETAILED DESCRIPTION OF PREFERRED EMBODIMENTS

Figure 1:
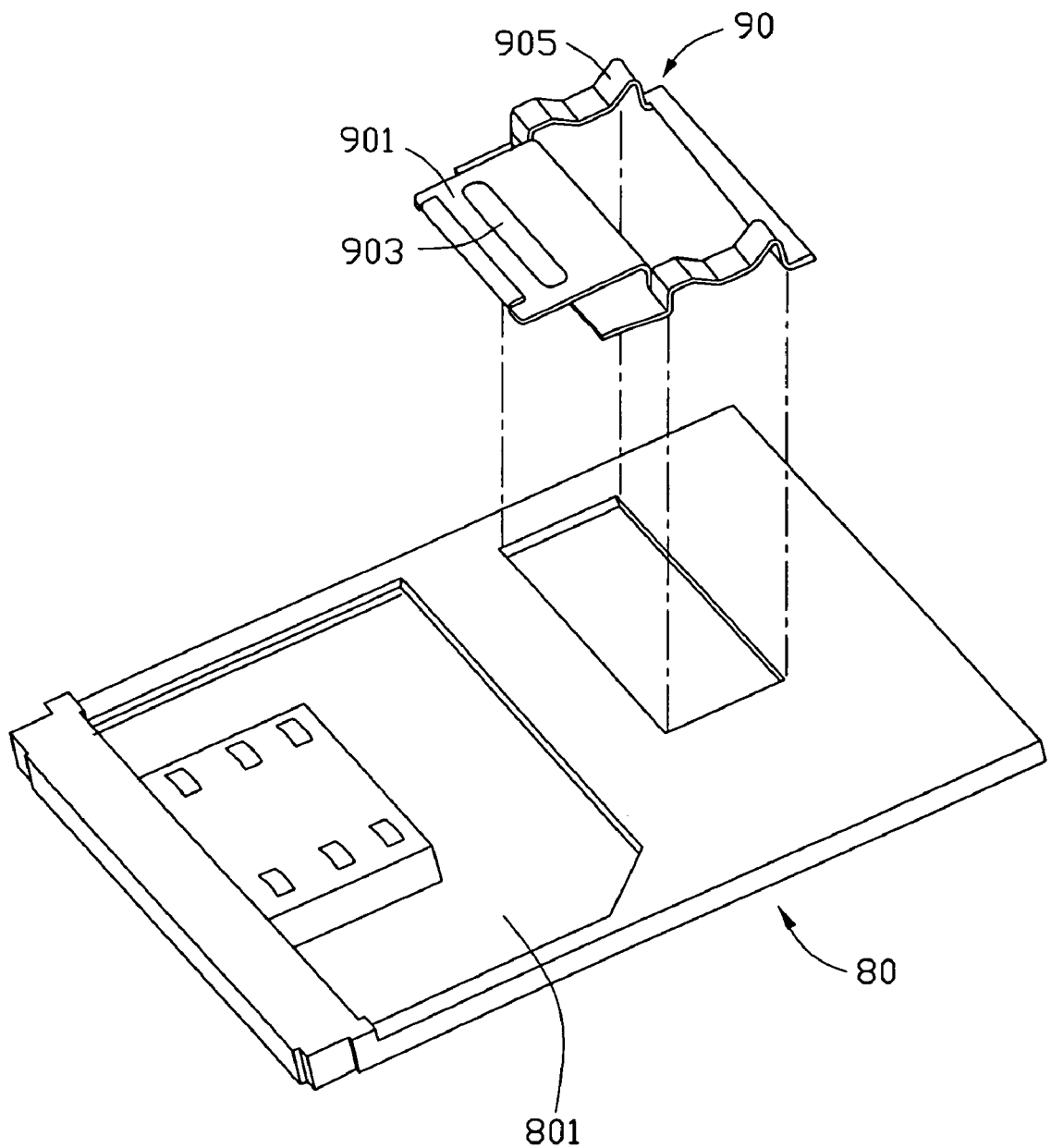
FIG. 1 is an exploded, isometric view of a conventional SIM card holder.
Figure 2:
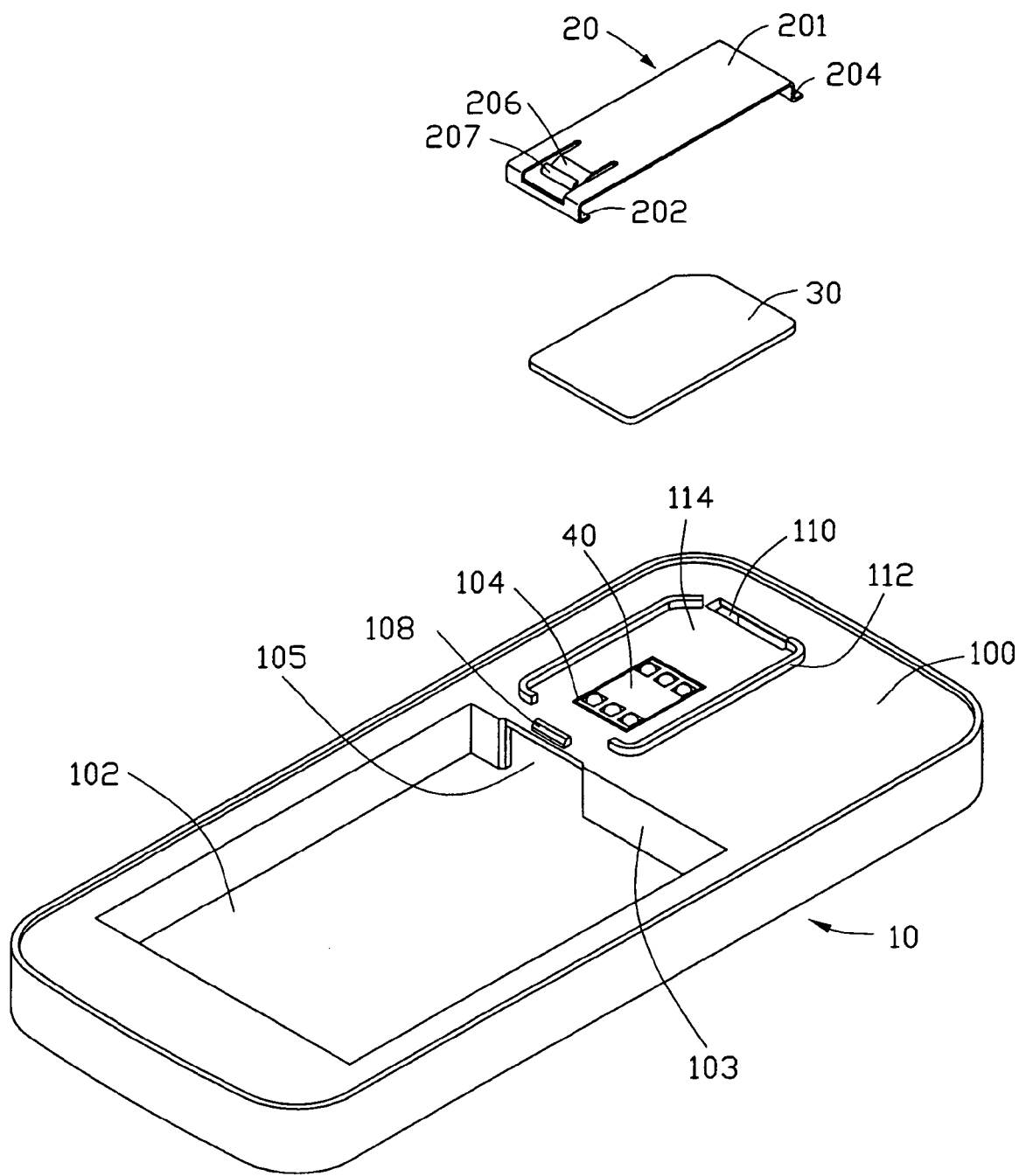
FIG. 2 is an exploded, isometric view of a SIM card holder in accordance with a preferred embodiment of the present SIM card holder.
Figure 3:
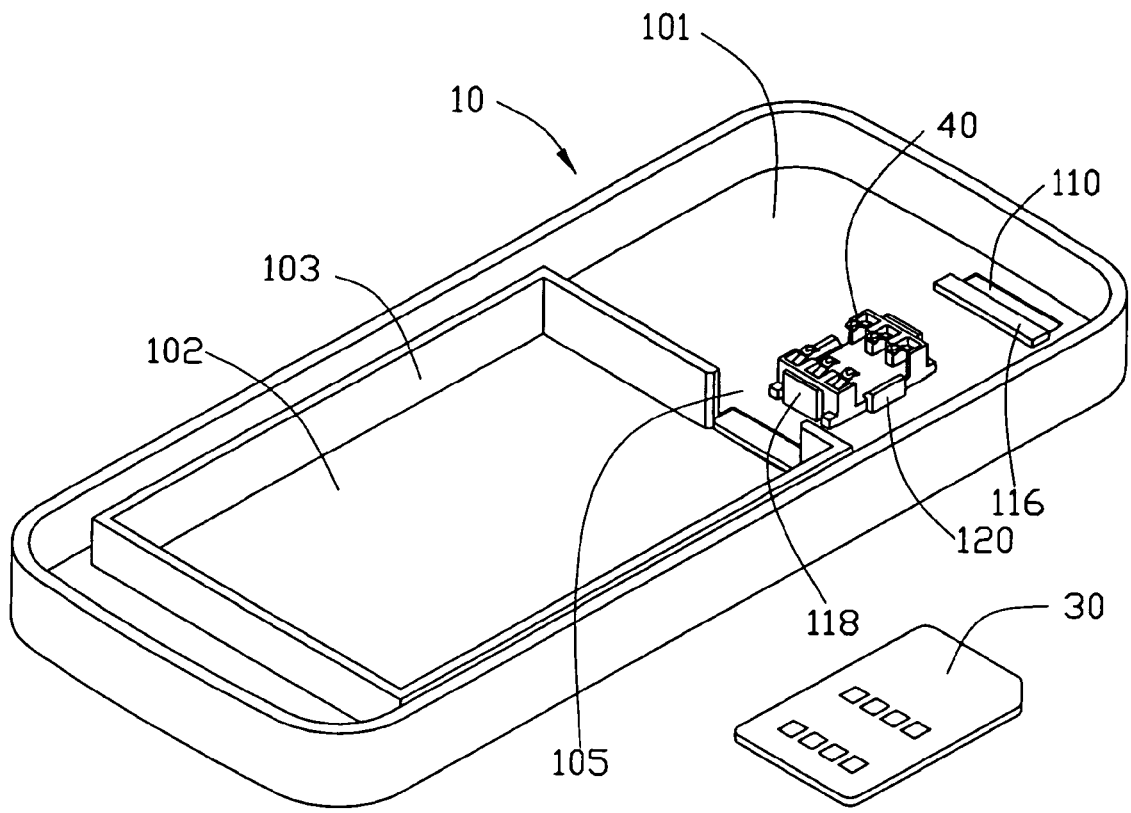
FIG. 3 is similar to FIG. 2, but viewed from another direction.
Figure 3:
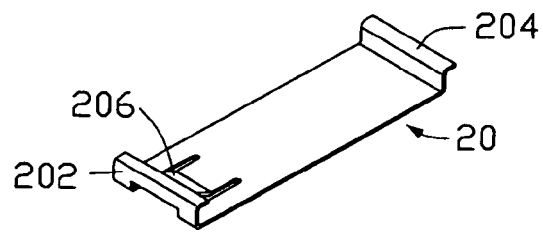

Referring to FIG. 2 and FIG. 3, a SIM card holder includes a housing 10 and a catching mechanism 20. A SIM card 30 is fixed on the housing 10 by the catching mechanism 20, and the SIM card 30 is electrically connected to a print circuit board (PCB, not shown) by a connector 40.

The housing 10 is approximately cuboid-shaped with a front surface 100 and a back surface 101. A receiving cavity 102 is defined in a bottom portion of the housing 10 for receiving a battery (not shown), and an opening 104 is defined in a top portion of the housing 10 for receiving the connector 40. The receiving cavity 102 is defined by four sidewalls 103. A nick or a hole 105 is defined in a sidewall 103 near the opening 104. Being adjacent to the nick 105, a protrusion 108 is formed on the front surface 100 of the housing 10, and located between the nick 105 and the opening 104. A slot 110 is defined at the front surface 100 of the housing 10 and is opposite to the protrusion 108 relative to the opening 104. Two strips 112 are formed on the housing 10 at the front surface 100 and are perpendicular to the protrusion 108 and the slot 110. Two ends of each strip 112 bend towards another strip 112, thereby cooperatively defining a receiving groove 114 for receiving the SIM card 30. A batten 116 is formed on the back surface 101 of the housing 10, aligning with the slot 110. Two catch boards 118 and two catch pieces 120 are formed on the back surface 101 of the housing 10 surrounding the opening 104 for housing the connector 40. The connector 40 is disposed at the back surface 101 and exposed out of the front surface 100 via the opening 104.

The catching mechanism 20 is approximately sheet-shaped having a main board 201. Two ends of the main board 201 perpendicularly bend in a same direction to form first bent portions and part of the first bent portions further perpendicularly bend in a same direction to form second bent portions, thereby forming a bending piece 202 and an opposite bending hem 204 at two ends of the main board 201. The bending piece 202 bends inward of the main board 201, and the bending hem 204 bends outward of the main board 201. An elastic slice 206 is forced out of the main board 201 adjacent to the end of the bending piece 202 by a punch and is disposed between the bending piece 202 and the bending hem 204. An end of the slice 206 adjacent to the bending piece 202 is a free end and the opposite end connects to the main board 201. A hook 207 is formed at the free end of the slice 206. A width of the main board 201 is dimensioned corresponding to a minimal distance between the two strips 112 of the housing 10. A width of the slice 206 is dimensioned corresponding to a length of the protrusion 108. The bending hem 204 of the catching mechanism 20 is inserted into the slot 110 of the housing 10 and the slice 206 resists the protrusion 108.

The SIM card 30 carries information that is necessary for operating the telephone and personal information of the owner. The SIM card 30 is a kind of integrated circuit card. The SIM card 30 is mounted in the receiving groove 114 and electrically connected with the connector 40.

Figure 4:
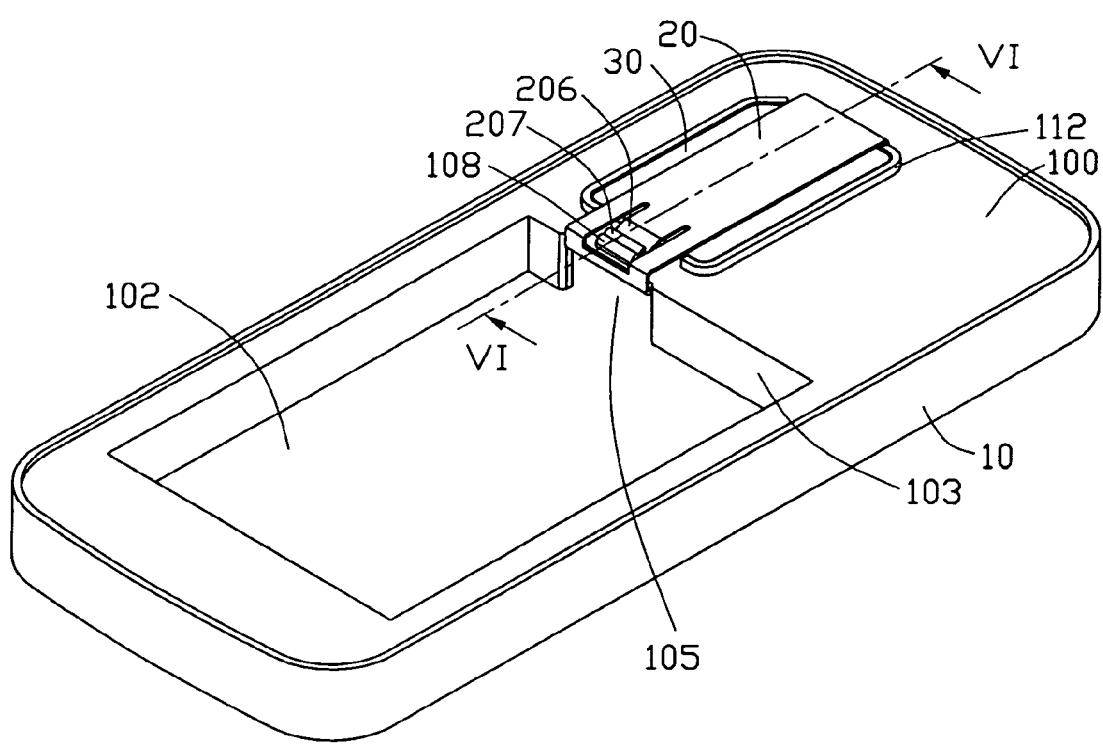
FIG. 4 is an assembled, isometric view of the SIM card holder of FIG. 2.
Figure 5:
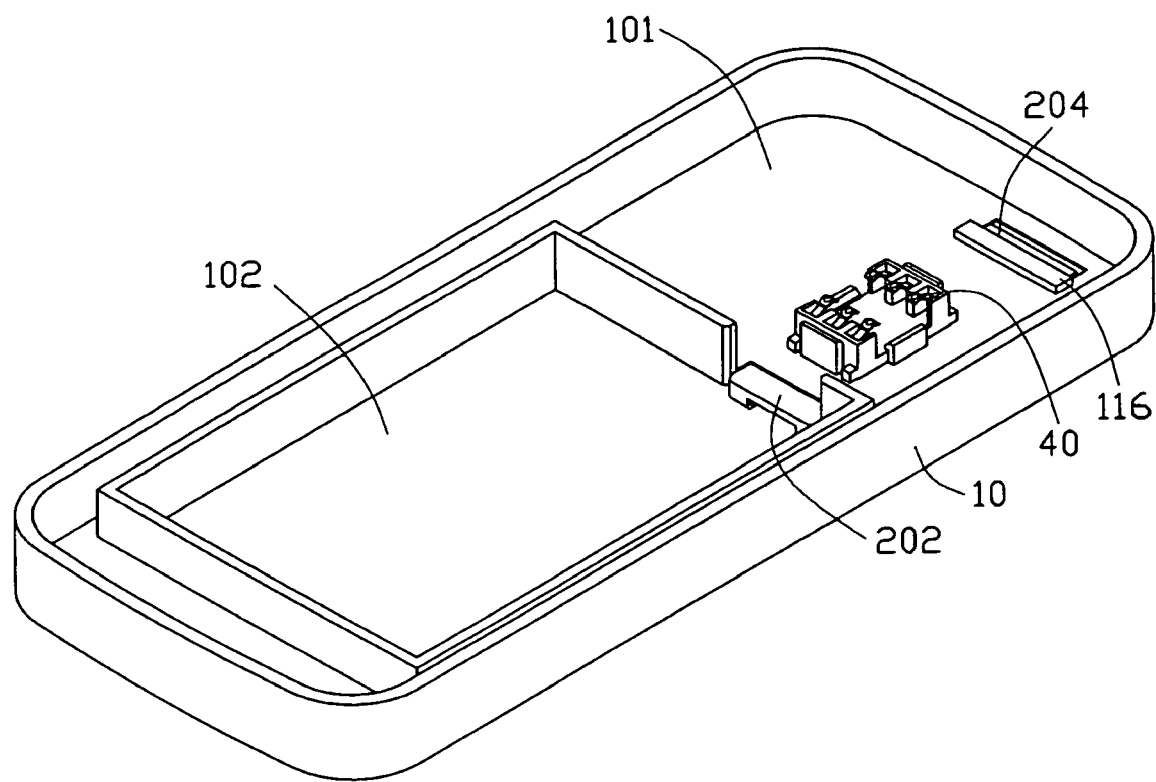
FIG. 5 is similar to FIG. 4, but viewed from another direction.
Figure 6:
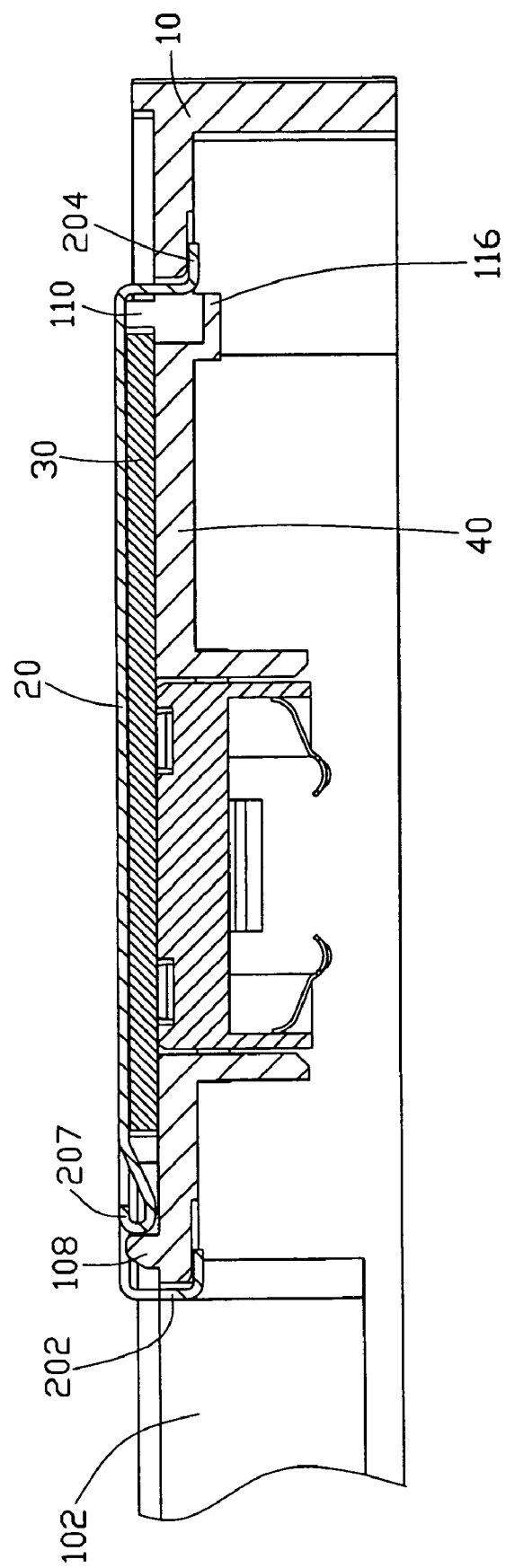
FIG. 6 is a cross-sectional view of the SIM card holder taken along the line VI—VI in FIG. 4.

Referring to FIGS. 4 through 6, in assembly, the SIM card 30 is mounted in the receiving groove 114 beforehand. The bending hem 204 of the catching mechanism 20 is inserted into the slot 110 of the housing 10, and the catching mechanism 20 is rotated about an angle of 90° afterward to make the main board 201 approximately parallel to the front surface 100 of the housing 10. The catching mechanism 20 is moved in a direction parallel to the strips 112 to make the catching mechanism 20 move towards the receiving cavity 102. Then the catching mechanism 20 is pressed downwards. The catching mechanism 20 is moved in a direction parallel to the strips 112 to make the catching mechanism 20 move away from the receiving cavity 102, thereby the bending piece 202 engages with the housing 10 at the position adjacent to the nick 105 and the bending hem 204 engages with the housing 10 at the position of the slot 110. The hook 207 of the catching mechanism 20 resists the protrusion 108. A cooperation of the bending piece 202, the bending hem 204 and the hook 207 with the housing 10 holds the catching mechanism 20 in position. The SIM card 30 is thus held on the housing 10. It can be seen that the SIM card holder merely includes two simple elements, i.e. the housing 10 and the catching mechanism 20. Thus, the SIM card holder is quite simple. In addition, the catching mechanism 20 is a thin board. Thus, the SIM card holder does not occupy much space.

Figure 7:
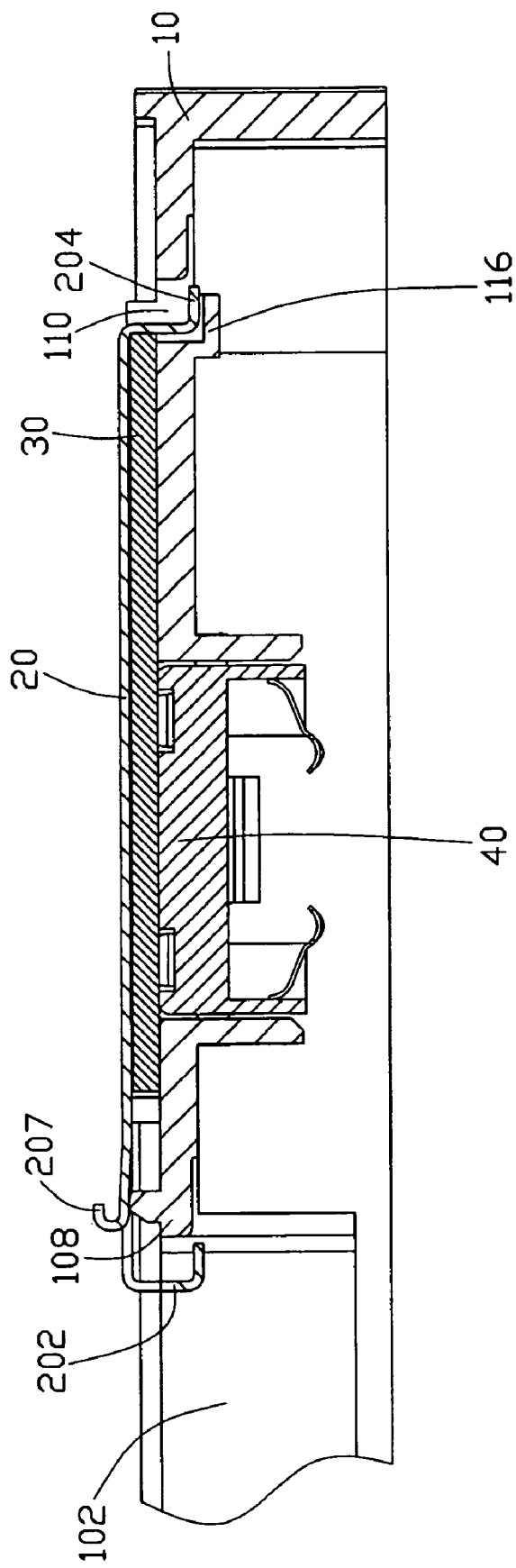
FIG. 7 is similar to FIG. 6, showing another state of the SIM card holder.

Referring to the FIG. 7, when removing the SIM card 30 from housing 10, at first, the hook 207 of the catching mechanism 20 is clawed and raised over the protrusion 108 of the housing 10, then the catching mechanism 20 is moved in parallel relative to the front surface 100 of the housing towards the receiving cavity 102. Thus, the bending piece 202 and the bending hem 204 disengage with the housing 10, shown in FIG. 7. Finally, the catching mechanism 20 is rotated through an angle, thereby the SIM card 30 is made removable from the housing 10. The SIM card 30 can also be removed after removing the catching mechanism 20 as the catching mechanism 20 is also removable from the housing 10. As such, the SIM card holder has greater ease of use.

Figure 8:
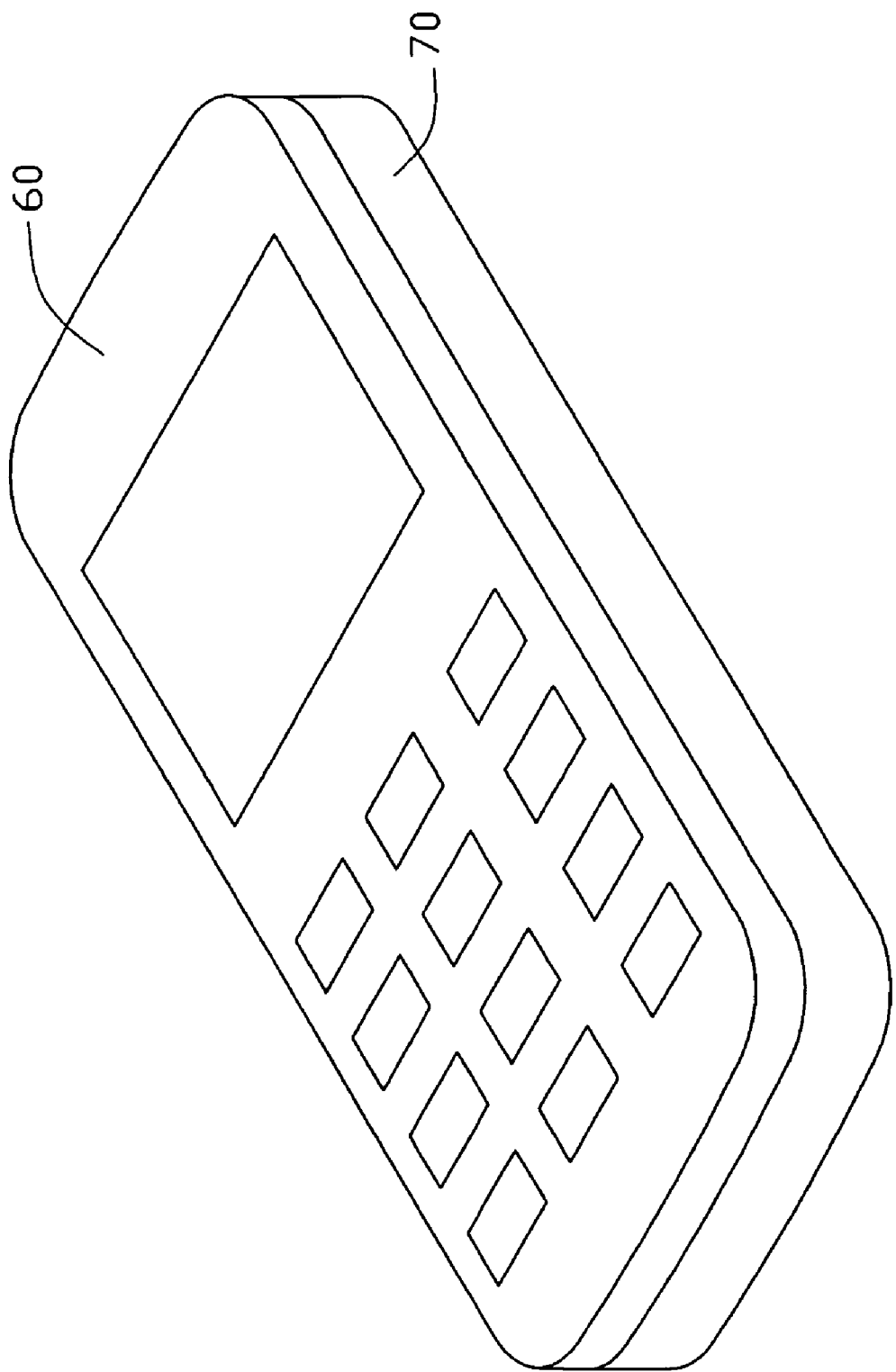
FIG. 8 is an isometric view of the holder for a mobile phone which employs the SIM card holder.

Referring to FIG. 8, the SIM card holder is applied in an exemplary mobile phone having a front cover 60 and a rear cover 70. The front cover 60 and the rear cover 70 cooperatively define an enclosed space. The housing 10 is mounted in the enclosed space.

In alternative embodiment, the receiving groove 114 can also be a slot defined in the housing 10, correspondingly, the strips 112 can be omitted. The housing 10 can be just a base for mounting the catching mechanism 20 and the SIM card 30 without the receiving cavity 102 for the battery.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A SIM (subscriber identification module) card holder, comprising:
    a base defining a receiving groove and a slot, the receiving groove being configured for receiving a SIM card therein, the base comprising a protrusion, the protrusion and the slot being arranged at two opposite sides of the receiving groove; and
    a catching mechanism comprising a main board having a bending piece and a bending hem at two opposite ends thereof, the bending hem being engaged in the slot, the bending piece being engagable with the base so as to lock the SIM card in the receiving groove, the main board comprising an elastic slice resisting the protrusion when the bending piece is engaged with the base, the catching mechanism being slidable in a first direction facilitating an engagement of both of the bending hem in the slot and the bending piece with the base, the catching mechanism further being slidable in a second opposite direction facilitating a corresponding disengagement of both of the bending hem and the bending piece, wherein the catching mechanism is configured such that, when the slice is pulled to move away from the protrusion, the catching mechanism slides relative to the base to make the catching mechanism rotatable in a manner such that the catching mechanism can be rendered removable from the base.

2. The SIM card holder as claimed in claim 1, wherein the base is substantially cuboid in shape, and has a front surface and a back surface, and the receiving groove is located at the front surface.

3. The SIM card holder as claimed in claim 2, wherein the bending hem comprises a first bent portion bent substantially perpendicularly downward from the end of the main board, and a second bent portion bent substantially perpendicularly outward from a free end of the first bent portion, the first bent portion extending through the slot, and the second bent portion abuts with the back surface when the bending piece is engaged with the base.

4. The SIM card holder as claimed in claim 3, wherein the base forms a batten at the back surface, the batten partly aligning with the slot.

5. The SIM card holder as claimed in claim 2, wherein the bending piece comprises a first bent portion bent substantially perpendicularly downward from the end of the main board, and a second bent portion bent substantially perpendicularly inward from a free end of the first bent portion, the second bent portion abutting with the back surface when the bending piece is engaged with the base.

6. The SIM card holder as claimed in claim 5, wherein the base defines a cavity adjacent the receiving groove, the base has a wall portion facing the cavity, the wall portion defines a nick therein, and the second bent portion of the bending piece extends to the back surface via the nick.

7. The SIM card holder as claimed in claim 1, wherein the receiving groove is formed by two opposite strips that are perpendicular to the protrusion and the slot, and two opposite ends of each strip bend towards the other strip.

8. The SIM card holder as claimed in claim 1, wherein the elastic slice extends slantwise from the main board, and forms a rolled portion at a free end thereof for resisting the protrusion, the slice being disposed between the bending piece and the bending hem, the rolled portion raising over the protrusion when the slice is pulled to move away from the protrusion.

9. An electronic device comprising:
front and rear covers cooperatively defining an enclosed space; and
a SIM (subscriber identification module) card holder mounted in the enclosed space, the SIM card holder comprising:
a base defining a receiving groove and a slot, the receiving groove being configured for receiving a SIM card therein, the base comprising a protrusion, the protrusion and the slot being arranged at two opposite sides of the receiving groove; and
a catching mechanism comprising a main board having a bending piece and a bending hem at two opposite ends thereof, the bending hem being detachably engaged in the slot, the bending piece being engagable with the base so as to lock the SIM card in the receiving groove, the main board comprising an elastic slice resisting the protrusion when the bending piece is engaged with the base, the catching mechanism being slidable in a first direction facilitating an engagement of both of the bending hem in the slot and the bending piece with the base, the catching mechanism further being slidable in a second opposite direction facilitating a corresponding disengagement of both of the bending hem and the bending piece wherein the catching mechanism is configured such that, when the slice is pulled to move away from the protrusion, the catching mechanism slides relative to the base to make the catching mechanism rotatable in a manner such that the catching mechanism can be rendered removable from the base.

10. The electronic device as claimed in claim 9, wherein the base is substantially cuboid in shape, and has a front surface and a back surface, and the receiving groove is located at the front surface.

11. The electronic device as claimed in claim 10, wherein the bending hem comprises a first bent portion bent substantially perpendicularly downward from the end of the main board, and a second bent portion bent substantially perpendicularly outward from a free end of the first bent portion, the first bent portion extending through the slot, and the second bent portion abuts against the back surface when the bending piece is engaged with the base.

12. The electronic device as claimed in claim 10, wherein the bending piece comprises a first bent portion bent substantially perpendicularly downward from the end of the main board, and a second bent portion bent substantially perpendicularly inward from a free end of the first bent portion, the second bent portion abutting against the back surface when the bending piece is engaged with the base.

13. The electronic device as claimed in claim 12, wherein the base defines a cavity adjacent the receiving groove, the base has a wall portion facing the cavity, the wall portion defines a nick therein, and the second bent portion of the bending piece extends to the back surface via the nick.

14. The electronic device as claimed in claim 9, wherein the receiving groove is formed by two opposite strips that are perpendicular to the protrusion and the slot, and two opposite ends of each strip bend towards the other strip.

15. The electronic device as claimed in claim 9, wherein the elastic slice extends slantwise from the main board, and forms a rolled portion at a free end thereof for resisting the protrusion, the slice being disposed between the bending piece and the bending hem, the rolled portion raising over the protrusion when the slice is pulled to move away from the protrusion.

16. A SIM (subscriber identification module) card holder for an electronic device, the holder comprising:
a base defining a receiving groove configured for receiving a SIM card therein; and
a catching mechanism comprising a main board having a first end movably attached to the base adjacent a first side of the receiving groove, and a second opposite end engagable with the base adjacent an opposite second side of the receiving groove to allow the main board to cover the receiving groove, wherein both of the first end and the second end of the main board are engageable with the base by moving the catching mechanism in a first direction along an axis parallel to the receiving groove, and further wherein the both of the first end and the second end of the main board are disengagable from the base by moving the catching mechanism in an opposite second direction along the axis parallel to the receiving groove.

17. The SIM card holder of claim 16, wherein the first end is attached to the base in such a manner that the catching mechanism is pivotable with respect to the base.

18. The SIM card holder of claim 17, wherein the first end is disengagable from the base after pivoting the first end.

19. The SIM card holder of claim 16, wherein the main board comprises a resilient portion configured for abutting against the base.

20. The SIM card holder of claim 16, wherein the first end comprises a first bent portion and second bent portion, the first bent portion being bent substantially perpendicularly downward from one end of the main board, the second bent portion being bent substantially perpendicularly outward from a free end of the first bent portion, the first bent portion extending through a slot defined in the base.

* * * * *